Nov. 11, 1924. 1,515,565
A. J. FINNEGAN
VEHICLE FENDER OR BUMPER
Filed April 1, 1924 2 Sheets-Sheet 1
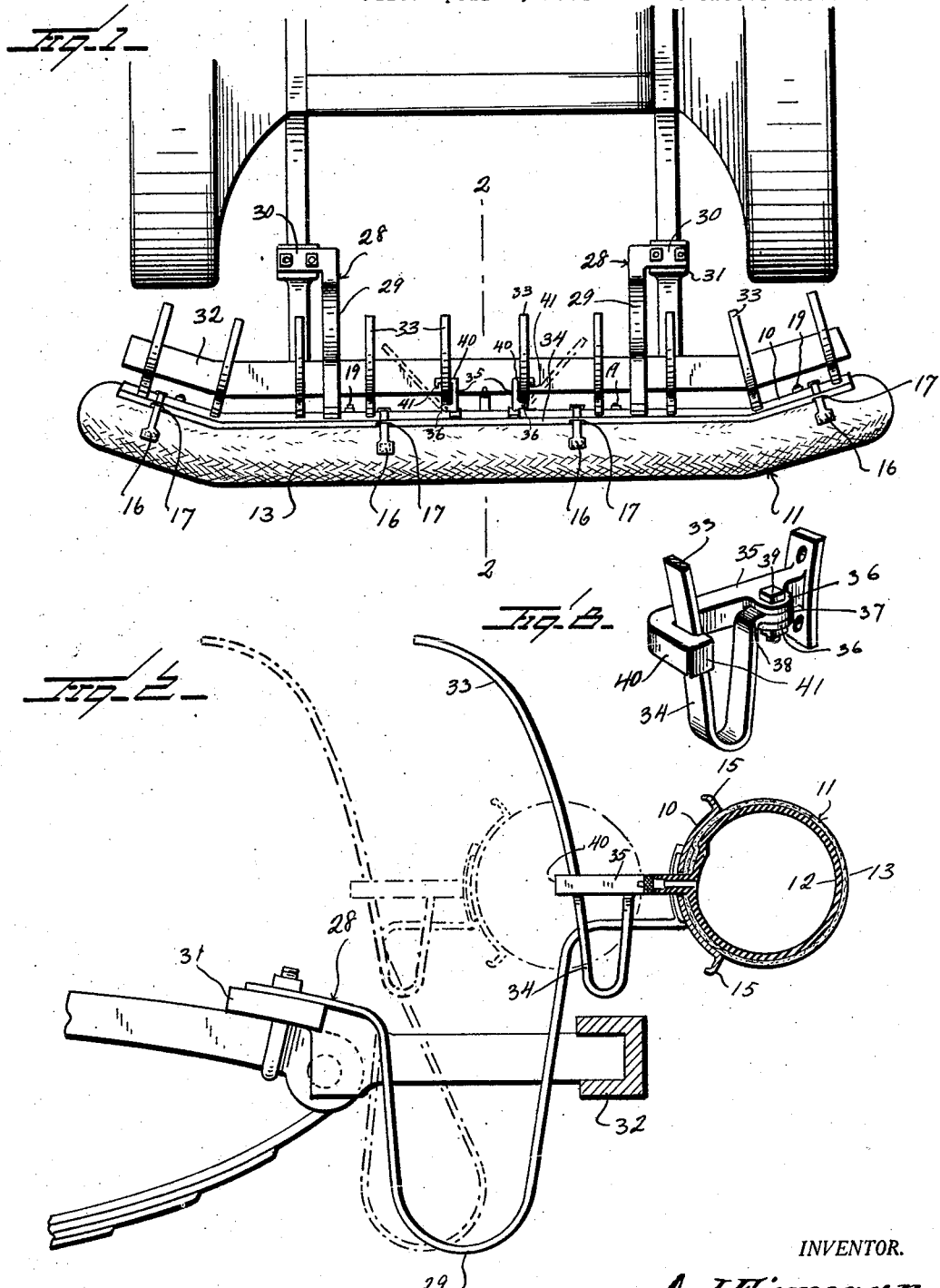
INVENTOR.
A. J. Finnegan
BY Watson E. Coleman
ATTORNEY.

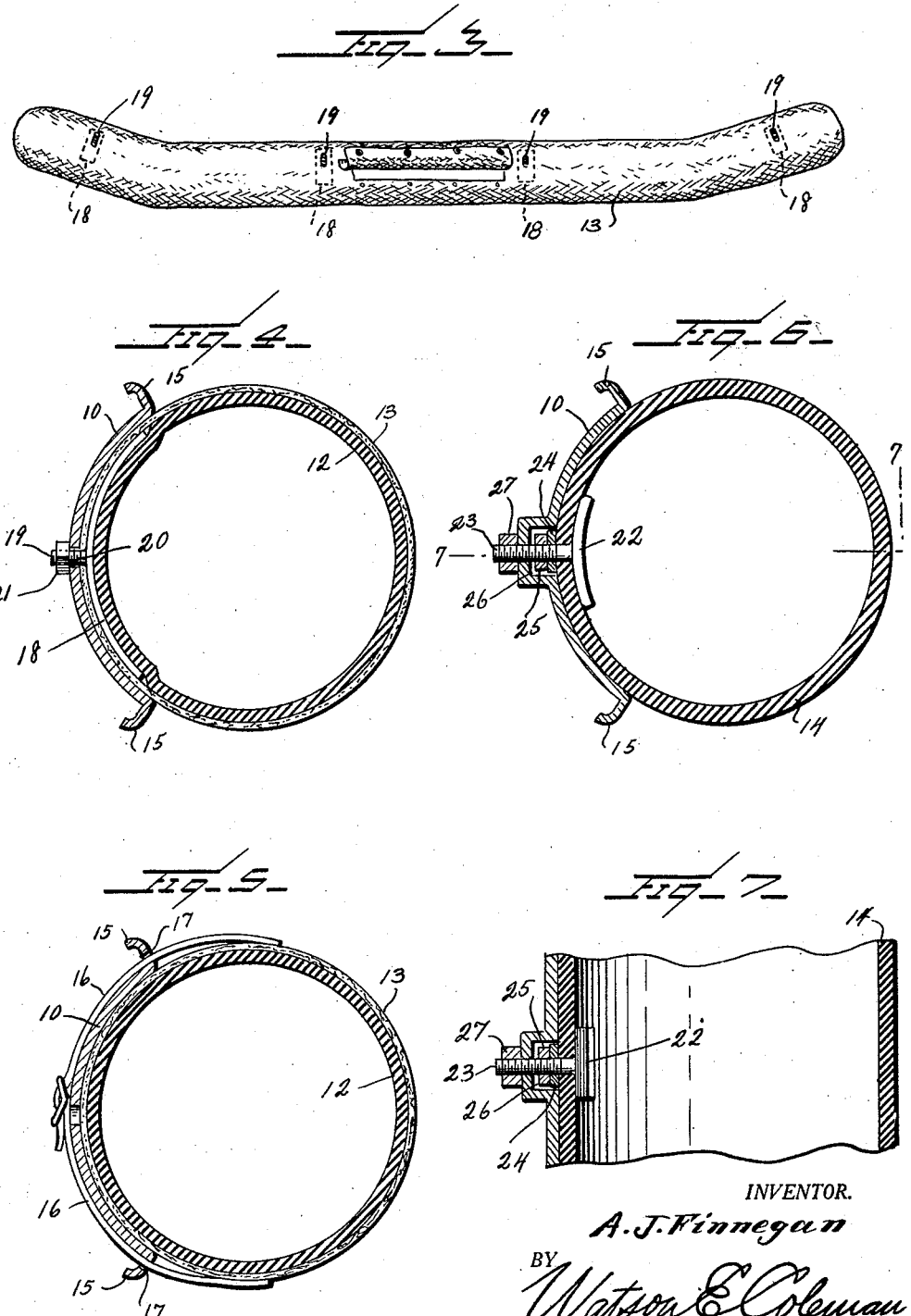

Patented Nov. 11, 1924.

1,515,565

UNITED STATES PATENT OFFICE.

AMBROSE J. FINNEGAN, OF CASTALIA, IOWA.

VEHICLE FENDER OR BUMPER.

Application filed April 1, 1924. Serial No. 703,464.

*To all whom it may concern:*

Be it known that I, AMBROSE J. FINNEGAN, a citizen of the United States, residing at Castalia, in the county of Winneshiek and State of Iowa, have invented certain new and useful Improvements in Vehicle Fenders or Bumpers, of which the following is a specification, reference being had to the accompanying drawings.

This invention relates to improvements in vehicle fenders or bumpers and more particularly to an improvement in the type of bumper shown in my prior Patent #1,313,282, patented August 19, 1919, for fenders.

An important object of the invention is to provide in combination with a fender of the construction shown in this prior patent a mounting for the fender whereby this fender may move rearwardly when it comes into violent contact with any resisting element.

A further object of the invention is to provide a fender of this character in combination with a rigid fender, the rigid fender being arranged rearwardly of the yielding fender to prevent too far rearward movement of the yielding fender and to prevent the object causing the movement of the yielding fender rearwardly from coming into contact with the front of the vehicle.

A further object of the invention is to provide in a device of this character means extending upwardly from the bumper preventing the passage of objects which contact the fender over the upper surface thereof.

A more specific object of the invention is to generally improve the structure disclosed in the patent above identified to render the same more practical and less liable to destruction in use.

These and other objects I attain by the construction shown in the accompanying drawings, wherein for the purpose of illustration is shown a preferred embodiment of my invention and wherein:—

Figure 1 is a plan view of a vehicle showing bumper apparatus attached thereto in accordance with my invention;

Figure 2 is a section on the line 2—2 of Figure 1;

Figure 3 is a perspective view of the cushioning element of the yieldable bumper detached;

Figures 4 and 5 are enlarged sectional views through the yieldable bumper showing two forms of means for securing the inflatable member thereto;

Figure 6 is a sectional view showing a slightly modified form of inflatable member and manner of attaching the same;

Figure 7 is a section on the line 7—7 of Figure 6;

Figure 8 is a perspective view showing the mounting of the two center spring fingers.

Referring now more particularly to the drawings, the numeral 10 indicates a support extending transversely of the vehicle and having its front face concave for the reception of a pneumatic cushioning element 11. This pneumatic cushioning element may consist either of an inflatable tube 12 disposed within a casing 13, as shown in Figures 1 to 5, or may consist simply of a suitable heavy inflatable tube 14, as indicated in Figures 6 and 7. The support 10 has its longitudinal edges rolled back at the top and bottom thereof, as indicated at 15, so that upon compression of the tube the edges of the support will not have the tendency to dig into and cut the same.

Any suitable means may be provided to mount the inflatable element 11 upon the support 10. In Figures 1 to 5 I have illustrated a combination of two types of fastening means. The first type consists of straps 16 secured to the casing 12 and extending about the plate or support 10, these straps being trained through openings 17 formed in the support. As an additional supporting means arcuately curved plates 18 are arranged interiorly of the casing 12 and are provided with threaded lugs 19 extending through the wall of the casing and through openings 20 formed in the support 10 to the rear face of the support where they are provided with binding nuts 21. Where simply a heavy tube is employed the fastening means preferably consists entirely in plates 22 disposed within the tube and having threaded lugs 23 extending through the tube. These lugs form a mounting for sealing washers 24 and securing elements 25 by means of which the washers are clamped in position to seal any possible opening about the lugs 23. In this type of construction the rear face of the support plate is preferably provided with pressed recesses 26 forming a housing for the washers 23 and securing elements 24. Through the rear walls of these recesses the lugs 23 extend for engagement by securing elements 27.

The support 10 has secured thereto at properly spaced intervals the forward ends of a pair of springs 28 each having an intermediate vertically disposed V-shaped portion 29 of considerable depth. The forward ends of these springs are rigidly secured in any manner to the support, while the rear ends thereof are provided with attaching flanges 30 adapted to seat upon the upper surface of the usual bumper attaching clips 31 employed in attaching the rigid type of bumper 32 to a vehicle. A fender or bumper of this character is preferably provided in combination with a rigid bumper and the V-shaped portion is of such dimensions that it extends downwardly between the point of attachment of the bumper to the frame of the vehicle and then upwardly and over the bumper to present the fender, as represented by the cushioning element 11, in advance of the rigid bumper 32. Attention is directed to Figure 2 of the drawings in which is shown in dotted lines the position to which the yielding fender moves when engaged with sufficient force. It will be obvious that the V-shaped portion of the attaching springs permits this yielding rearwardly to present the rigid bumper 32 for engagement by the element causing the yielding, thus preventing too great a strain to be placed upon the attaching springs or the inflated fender 11 and at the same time softening the blow which would otherwise be imparted by the rigid bumper 32.

The support 10 has preferably secured thereto a plurality of spring fingers 33 each including a downwardly extending portion 34 from the lower end of which the spring fingers 33 extend upwardly and slightly rearwardly. These fingers are for the purpose of preventing articles engaged by the yielding bumper from passing over the upper surface of the bumper for engagement with the front of the vehicle and for preventing such passage without presenting a rigid obstruction thereto.

It will be obvious that were these spring fingers all rigidly attached to the yielding bumper they would be seriously in the way in the event that it was necessary to start the machine with a hand crank. I accordingly mount the two central spring fingers 33 in a manner to permit their being oscillated about the mounting so that they provide a space centrally of the bumper to permit a hand crank to be readily reached. This mounting comprises brackets 35 secured at their forward ends to the transverse member 10 and provided adjacent such forward ends with a pair of vertically spaced horizontally disposed ears 36. Between these ears is directed a flattened hub portion 37 formed upon the end of a forwardly disposed portion 38 of the downwardly extending portion 34 of the spring fingers 33. A pivot bolt 39 is directed through the ears and this flattened portion thus permitting the spring fingers 33 to be oscillated in a horizontal plane. The outer end of the bracket is provided with a right angular horizontal extension 40 of the same width as the spring and at the end of this extension a forwardly directed lug 41 is disposed. It will be obvious that by placing strain upon the spring fingers they may be sprung into the space between this lug and the bracket proper and will be held against horizontal movement by their engagement between these two portions. However, a slight strain will release the spring fingers permitting them to be swung to one side so that a clearance is provided permitting engagement of the starting crank.

It will be obvious that a bumper of this character may be readily applied in combination with the usual rigid bumper with which many automobiles are now equipped and in combination with this bumper I provide a structure preventing, in a large measure, the damage caused in collision by such rigid bumpers, since the effect of the shock is cushioned before the rigid bumper is actually brought into play. At the same time the rigid bumper holds the yielding bumper to prevent destruction thereof and to prevent an article with which the machine collides from engaging the front of the vehicle where the yielding bumper would prove insufficient for this purpose.

Many changes being possible in the construction of the device as hereinbefore set forth without materially departing from the spirit of my invention, I do not limit myself to such specific structure except as hereinafter claimed.

I claim:—

1. In combination with a vehicle, a rigid member extending transversely of the vehicle and in advance thereof, a yieldable member likewise extending transversely of the vehicle in advance thereof and in advance of said rigid member, the mountings of said yieldable member permitting movement thereof from a point in advance of the rigid member to a point rearwardly of the rigid member when subject to impact.

2. In combination with a vehicle, a rigid member extending transversely of the vehicle and in advance thereof, a yieldable member likewise extending transveresly of the vehicle in advance thereof and in advance of said rigid member, the mountings of said yieldable member permitting movement thereof from a point in advance of the rigid member to a point rearwardly of the rigid member when subject to impact and comprising springs having intermediate V-shaped portions the ends of the arms of which are provided with means for attachment to the frame of the vehicle and for attachment to the yieldable member respectively.

3. In combination with a vehicle, a rigid member extending transversely of the vehicle and in advance thereof, a yieldable member likewise extending transversely of the vehicle in advance thereof and in advance of said rigid member, the mountings of said yieldable member permitting movement thereof from a point in advance of the rigid member to a point rearwardly of the rigid member when subject to impact, said rigid member by its engagement with an obstruction limiting the rearward movement of the yieldable member.

4. In combination with a vehicle, a rigid member extending transversely of the vehicle and in advance thereof, a yieldable member likewise extending transversely of the vehicle in advance thereof and in advance of said rigid member, the mountings of said yieldable member permitting movement thereof from a point in advance of the rigid member to a point rearwardly of the rigid member when subject to impact, and common means for securing the mountings of the rigid member and the yieldable member to the vehicle.

5. In a yieldable bumper construction, an elongated member having a concave face adapted to be forwardly arranged, an inflatable member seated in the concavity of the elongated member, said elongated member being provided at its side edges with outstanding flange portions, and securing elements for the inflatable member extending through the flanges of the elongated member.

6. In a yieldable bumper construction, an elongated member having a concave face adapted to be forwardly arranged, an inflatable member seated in the concavity of the elongated member, said elongated member being provided at its side edges with outstanding flange portions, and securing elements for said inflatable member extending through said elongated member, said inflatable member comprising an outer casing and an inner tube, said securing elements comprising plates disposed within the casing having shank portions extending through the casing and elongated member.

7. In a bumper, a transversely extending member adapted to be supported in advance of a vehicle and spring fingers secured to the rear surface of said member and extending upwardly therefrom, said spring fingers having an intermediate downwardly directed V-shaped portion at the point of attachment to said transverse member permitting yielding thereof under impact.

8. In a bumper, a transversely extending member adapted to be supported in advance of a vehicle and spring fingers secured to the rear surface of said member and extending upwardly therefrom, said spring fingers having an intermediate downwardly directed V-shaped portion at the point of attachment to said transverse member permitting yielding thereof under impact, certain of said fingers being mounted upon said transverse member for pivotal movement in a horizontal plane whereby they may be swung to opposite sides of the center to provide a clearance permitting engagement of the hand crank of the vehicle to which the device is attached.

In testimony whereof I hereunto affix my signature.

AMBROSE J. FINNEGAN.